United States Patent
Chen

(10) Patent No.: US 6,713,995 B2
(45) Date of Patent: Mar. 30, 2004

(54) VOLTAGE REGULATOR WITH PULSE WIDTH MODULATION IN DUAL FREQUENCIES

(75) Inventor: Seng-Feng Chen, Taipei Shien (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 10/318,169

(22) Filed: Dec. 13, 2002

(65) Prior Publication Data

US 2003/0201758 A1 Oct. 30, 2003

(30) Foreign Application Priority Data

Apr. 25, 2002 (TW) ........................................ 91108569 A

(51) Int. Cl.[7] ................................................. G05F 1/56
(52) U.S. Cl. ..................................... 323/284; 323/283
(58) Field of Search ................................ 323/282, 283, 323/284, 285, 288

(56) References Cited

U.S. PATENT DOCUMENTS 5,841,643 A * 11/1998 Schenkel ................ 323/282 X
6,181,120 B1 * 1/2001 Hawkes et al. ............. 323/282
6,518,738 B1 * 2/2003 Wang ......................... 323/284

FOREIGN PATENT DOCUMENTS

TW  414333  12/2000

* cited by examiner

Primary Examiner—Jessica Han
(74) Attorney, Agent, or Firm—Rabin & Berdo, P.C.

(57) ABSTRACT

A voltage regulator for pulse width modulation in dual frequencies is provided to be able to operate under a PWM voltage regulation mode, which can take a different frequency according to the degree of loading effect under light load or heavy load. In order to determine the degree of loading effect, a heavy-load reference voltage and a light-load reference voltage are predetermined to be served as reference voltages. When the error signal is greater than the heavy-load reference voltage, the load is a heavy load and then a modulation signal at a higher frequency, such as 200 KHz, is used to drive a transistor of the voltage regulator. Conversely, when the error signal is less than the light-load reference voltage, the load is a light load and then a modulation signal at a smaller frequency, such as 20 KHz, is used to drive the transistor. In this way, improved power conversion efficiency can be achieved.

15 Claims, 5 Drawing Sheets

VOLTAGE REGULATOR WITH PULSE WIDTH MODULATION IN DUAL FREQUENCIES

This application incorporates by reference Taiwan application Ser. No. 091108569, filed on Apr. 25, 2002.

BACKGROUND OF THE INVENTION

1. Field of the Invention

The invention relates in general to a voltage regulator, and more particularly to a pulse width modulation (PWM) voltage regulator.

2. Description of Related Art

As more and more powerful and innovative portable electronic devices are being developed, the efficiency of the switching power converters for supplying power to the portable electronic devices becomes more significant. In order to improve the power converting efficiency, the pulse width modulation (PWM) power converter has been widely applied to various electronic products. Referring to FIG. 1, a conventional PWM voltage regulator is illustrated. Suppose a load terminal voltage Vt between a load terminal of the PWM voltage regulator and the ground has a voltage rating of 5V. When a reduced load is connected to the load terminal, the load terminal voltage Vt will increase slightly to 5.01 V, for example. In order to stabilize the load terminal voltage Vt to the voltage rating, a switching device, such as a transistor Q, can be used to adjust the input current fed to the load. After the effective value of the input current is reduced, the load terminal voltage Vt will be reduced to the voltage rating so as to achieve voltage regulation. In order to implement the foregoing function, the control circuit 100 can be connected to the load terminal and the transistor Q. The control circuit 100 has an error amplifier 110 for detecting an error between the load terminal voltage Vt and a reference voltage Vr, in which the reference voltage level Vr can be set to 5V, that is, the voltage rating at the load terminal. In addition, an error signal er with respect to this error is produced. The oscillator 130 can produce an oscillating signal at a constant frequency, such as a 200-KHz sawtooth signal. The oscillating signal is also fed into a modulation signal generator 120, such as a comparator. After the modulation signal generator 120 receives the error signal er and the oscillating signal, a modulation signal ms will be generated according to these two signals, and the modulation signal ms will be fed to a driving device 140. Then, the driving device 140 makes the conduction period for the transistor Q shorter according to the modulation signal ms. As a result, the effective value of the current flowing through the transistor Q will be reduced, and the load terminal voltage Vt will return to the voltage rating.

Referring to FIG. 2, a schematic diagram illustrates a relation among the error signal, the oscillating signal, and the modulation signal. The oscillating signal, for example, has a frequency of 200 KHz and a sawtooth waveform. The modulation signal generator 120 can convert the relation between the error signal er and the oscillating signal into the modulation signal ms. When the error signal er is greater than the oscillating signal, the modulation signal ms can be set to a high level. When the error signal er is less than the oscillating signal, the modulation signal ms can be set to a low level. Therefore, if the load terminal voltage level Vt is higher than the reference voltage level Vr, the error signal er is lowered, so that the modulation signal ms has a shorter duration at the high level. Since the driving device 140 is to drive the transistor Q based on the modulation signal ms, the conduction period for the transistor Q is shortened. As a result, the effective value of the current flowing into the load is reduced, and the load terminal voltage level Vt is reduced. Since this is a closed loop control, the load terminal voltage level Vt can be stabilized at the voltage rating, that is, Vr=Vt.

As described above, the modulation signal ms results from the comparison of the error signal er and the oscillating signal, and therefore the frequencies of the modulation signal ms and the oscillating signal are the same. Since the oscillating signal has a constant frequency and a sawtooth waveform, the modulation signal ms has a constant frequency also, but only the pulse width would vary as the load varies. In other words, no matter whether a light load or a heavy load is connected to the PWM regulator, the PWM regulator uses a signal at a constant frequency, whose pulse width may change with the load, to switch on and off the transistor Q. Since the power consumption for the light load is rather small, the conduction period for the transistor Q is relatively shorter and the power transmitted during the conduction period is less. However, while the PWM regulator operates at light load under the PWM mode, the transistor Q even has a switching rate of 200,000 times per second, if the oscillating signal is set to 200 KHz, for example. There is power loss when the transistor Q is switched on and off and as a result, the efficiency of the power conversion decreases significantly. In order to solve the issue of poor efficiency under the PWM mode at light load, a PWM/PFM dual mode converter has therefore been developed. The PWM/PFM dual mode converter enters the PWM mode at heavy load, but enters the pulse frequency modulation (PFM) mode at light load. The PFM uses a modulation signal with the same pulse width but a changeable frequency to drive the transistor Q, so that the efficiency of power conversion is improved. This manner can solve the problem of poor efficiency of the power conversion at light load. However, unwanted noise would occur due to vibration of the inductance and the voltage effect from the ceramic capacitor, when the operation mode is switched to the PFM mode at light load and the frequency of the modulation signal is within the range of about 20 Hz to 20 KHz. In this situation, it would cause an increase of the ripple voltage output due to the decrease of the working frequency.

Due to the foregoing reasons, how to improve the efficiency of power conversion with respect to the light load condition and further prevent the noise is then a very important issue to be solved.

SUMMARY OF THE INVENTION

It is therefore an objective of the invention to provide a voltage regulator with pulse width modulation in dual frequencies, so that the efficiency of power conversion can be effectively improved for the light load condition, and the occurrence of noise can be prevented also.

In accordance with the foregoing and other objectives of the invention, the invention provides a voltage regulator with pulse width modulation in dual frequencies, which is briefly described as follows.

The voltage regulator with pulse width modulation in dual frequencies takes the PWM voltage regulation mode using a different frequency according to the degree of loading effect on the voltage regulation. In order to determine the degree of loading effect, a heavy-load reference voltage and a light-load reference voltage can be predetermined. When the error signal is greater than the heavy-load reference voltage, the load is a heavy load and a modulation signal at a higher frequency, such as 200 KHz, is used to drive the transistor.

Conversely, when the error signal is less than the light-load reference voltage, the load is a light load and a modulation signal at a lower frequency, such as 20 KHz, is used to drive the transistor. In this way, the efficiency of power conversion is improved.

The voltage regulator with pulse width modulation in dual frequencies includes a transistor switcher, an error amplifier, a dual frequency signal generator, a modulation signal generator, a load sensing device, an OR operator, an AND operator, and a driving device. The dual frequency signal generator is used for generating a high frequency signal and a low frequency signal. The modulation signal generator can receive the high frequency signal and the error signal and then can modulate the two signals into a modulation signal, in which the frequencies for the high frequency signal and the modulation signal are the same. On the other hand, the load sensing device can determine the effect of loading, that is, whether the load is light or heavy, according to the error signal. When the load is determined to be a heavy load, a selection signal is set to logic 1, for example. When the load is determined to be a light load, the selection signal is set to logic 0. After the OR operator performs an OR logic operation for the low frequency signal and the selection signal, an OR operation signal is outputted, in which the OR operation signal is at logic 1 under heavy load, and the OR operation signal is the same as the low frequency signal under light load.

The AND operator is used for performing an AND logic operation of the modulation signal and the OR operation signal, and outputting an AND operation signal to the driving device. The driving device can control the on and off states of the transistor according to the AND operation signal. Since the OR operation signal is at logic 1 under heavy load, the AND operation signal is identical to the modulation signal at high frequency. In addition, since the OR operation signal is equal to the low frequency signal under light load, the AND operation signal is identical to the modulation signal at low frequency.

In the practical applications, dual frequency signal generator can use a signal generator and a frequency divider to achieve the function. The signal generator, such as a high frequency signal generator, can generate the high frequency signal for use by the modulation signal generator, but also can provide the logic operators with a low frequency signal by dividing the high frequency signal with the frequency divider. It is certain that the design can also be implemented with a low frequency signal generator and a frequency multiplier, wherein the low frequency signal generator is used to generate a low frequency signal, and then the low frequency signal can be multiplied by a factor by the frequency multiplier.

The load sensing device can be implemented with a light-load sensing device, a heavy-load sensing device, and a frequency selector, in which the heavy-load sensing device can compare the error signal with the heavy-load reference voltage. If the error signal is greater than the heavy-load reference voltage, a heavy load signal is outputted to the frequency selector. Similarly, the light-load sensing device can compare the error signal with the light-load reference voltage. If the error signal is less than the light-load reference voltage, a light load signal is outputted to the frequency selector. In this manner, when the frequency selector receives the heavy load signal, the selection signal can be set to for example, logic 1, and when the frequency selector receives the light load signal, the selection signal can be set to logic 0. The frequency selector can be implemented with a latch circuit, such as an RS latch circuit, for example.

Other objects, features, and advantages of the invention will become apparent from the following detailed description of the preferred but non-limiting embodiments. The following description is made with reference to the accompanying drawings.

DETAILED DESCRIPTION OF PREFERRED EMBODIMENTS

Figure 1:
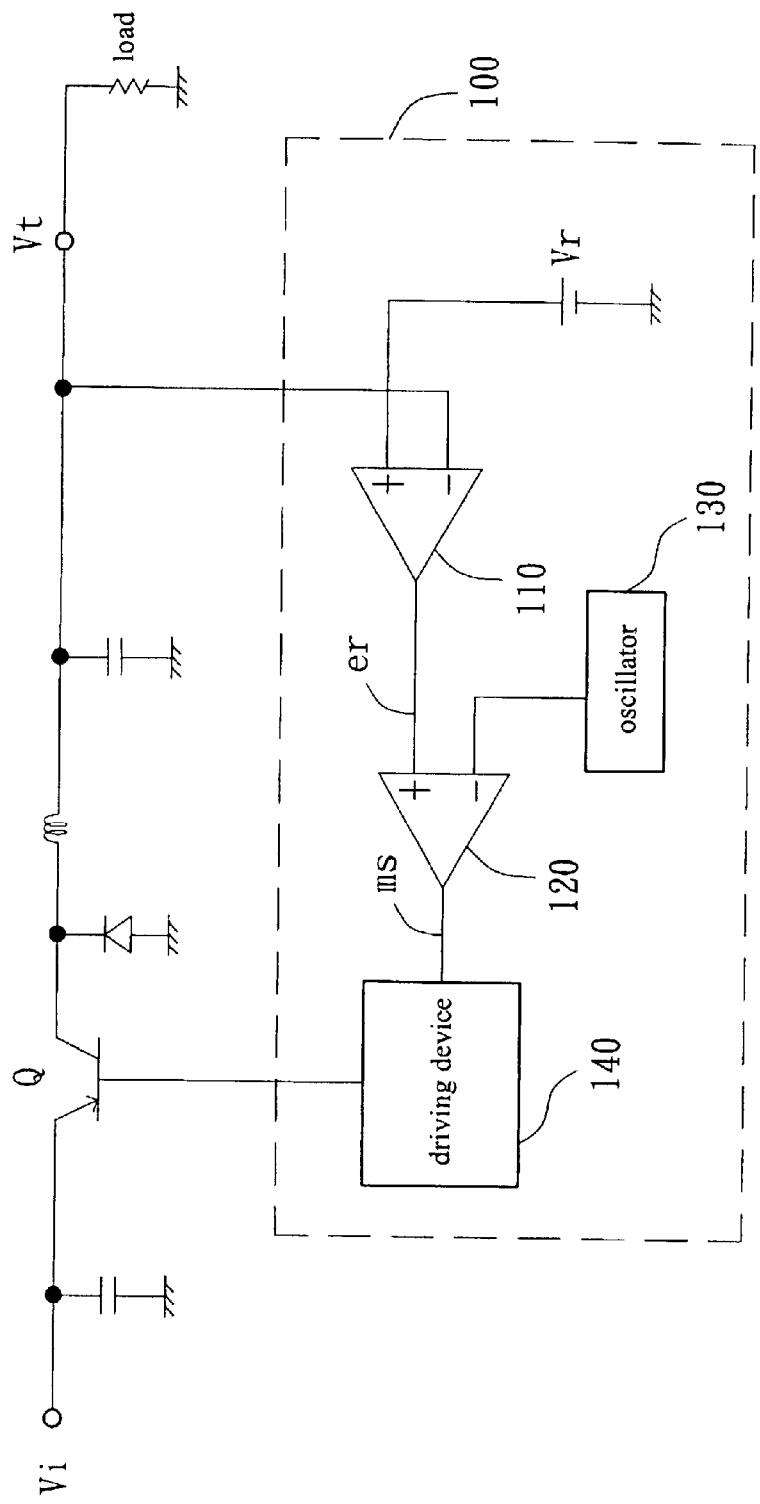
FIG. 1 (Prior Art) is a schematic diagram of a conventional PWM voltage regulator.
Figure 2:
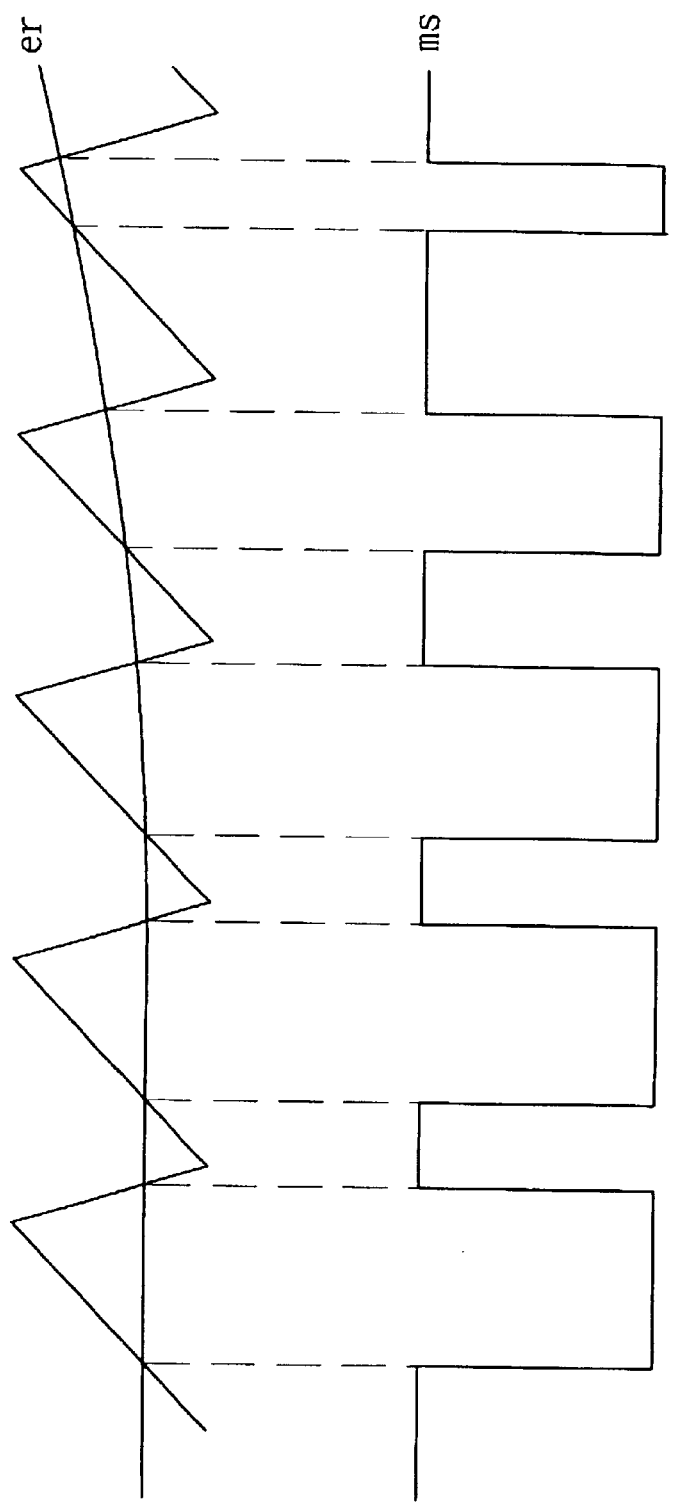
FIG. 2 (Prior Art) illustrates a relation among the error signal, the oscillating signal, and the modulation signal with respect to FIG. 1.
Figure 3:
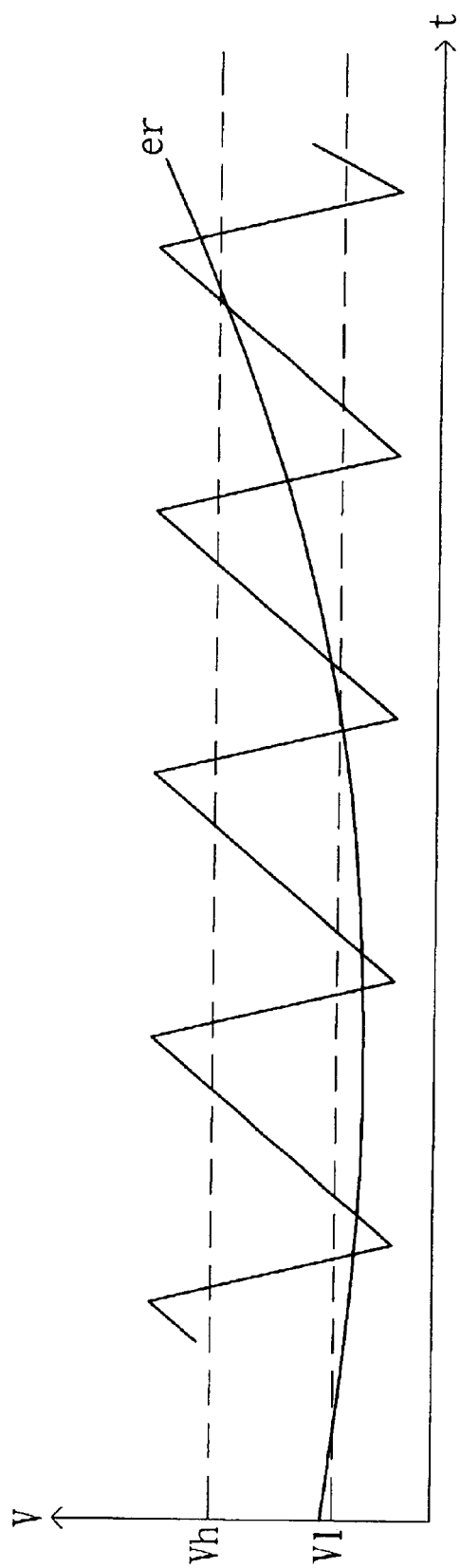
FIG. 3 illustrates the detection of loading effect on a power converting circuit according to the invention.

Referring to FIG. 3, the detection of loading effect on a power converting circuit is illustrated according to the invention. In order to detect the degree of the loading effect on the power converting circuit, two voltage levels can be set beforehand for reference, in which one is referred to as a heavy-load reference voltage Vh and the other one as a light-load reference voltage Vl. An error signal er is produced by comparing the load terminal voltage with a reference voltage. The error signal er is then compared with the light-load reference voltage Vl or the heavy-load reference voltages Vh. If the error signal er is higher than the heavy-load reference voltage Vh, the current load is a heavy load. In this case, a modulation signal with a higher frequency, such as 200 KHz, is used to drive a switching element, for example a transistor, of the power converting circuit, wherein the transistor Q can be a bipolar junction transistor (BJT), such as a PNP transistor or an NPN transistor. Conversely, if the error signal er is less than the light-load reference voltage Vl, the current load is a light load. In this case, a modulation signal with a smaller frequency, such as 20 KHz, is used to drive the transistor, so as to improve the efficiency for power conversion. When the frequency of the modulation signal is constantly beyond the range of audible frequencies, the human ear then will not be able to hear the noise. As a result, the noise problem of the PFM mode will be prevented by the invention.

Figure 4:
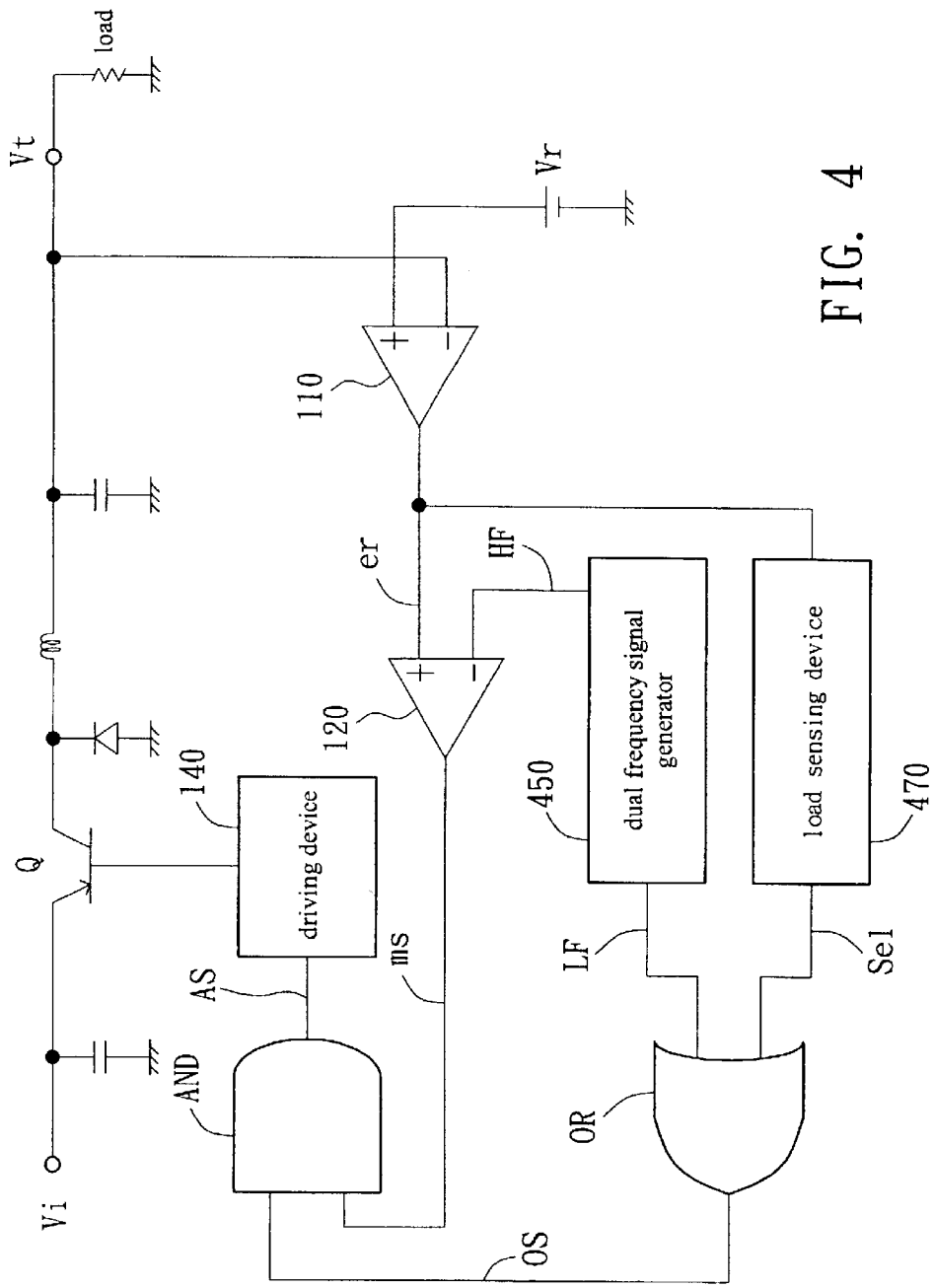
FIG. 4 is a voltage regulator with pulse width modulation in dual frequencies according to a preferred embodiment of the invention.

Referring to FIG. 4, a voltage regulator with pulse width modulation (PWM) in dual frequencies is shown according to one preferred embodiment of the invention. The feature of the invention is that two modulation signals at different frequencies are used to control the conducting state of the transistor according to the degree of the loading effect. For example, a modulation signal at the frequency of 200 KHz is used under heavy load, while a modulation signal with the frequency of 20 KHz is used under light load. With respect to implementation, a dual frequency signal generator 450 can be employed to generate a high frequency signal HF and a low frequency signal LF, in which the high frequency signal HF is outputted to the modulation signal generator 120 and the low frequency signal LF is outputted to the OR operator. The high frequency signal HF has, for example, a frequency of 200 KHz and a sawtooth waveform, and the low frequency signal LF has, for example, a frequency of 20 KHz and a sawtooth waveform. After the modulation signal generator 120 receives the high frequency signal HF and the error signal er, these two signals can be modulated into a modulation signal ms and the modulation signal ms is then outputted. If the high frequency signal HF is at 200 KHz, the modulation signal ms will be at 200 KHz also.

The load sensing device 470 can determine the degree of the loading effect according to the error signal er. Under heavy load, the selection signal sel is set to logic 1, and under light load, the selection signal sel is set to logic 0. The OR operator then performs an OR operation on the low frequency signal LF and the resulting selection signal sel and outputs an OR operation signal OS. Since the selection signal sel is at logic 1 under heavy load, the OR operation signal OS is set to logic 1. Since the selection signal sel is at logic 0 under light load, the OR operation signal OS is equal to the low frequency signal LF.

On receiving the modulation signal ms and the OR operation signal OS, the AND operator performs an AND operation on the modulation signal ms and the OR operation signal OS and then outputs an AND operation signal AS to the driving device 140 in FIG. 4 so that the driving device 140 can control the transistor Q according to the AND operation signal AS. In the case of a heavy load, since the OR operation signal OS is set to logic 1 as described above, the AND operation signal AS generated by performing an AND operation on the modulation signal ms and the OR operation signal OS is equal to the modulation signal ms. In addition, the frequencies of the AND operation signal AS and the modulation signal ms are also the same. As a result, the frequency of the AND operation signal AS is 200 KHz under heavy load. Under light load, the OR operation signal OS is at a frequency of 20 KHz with respect to the low frequency signal LF. Therefore, after the modulation signal ms and the OR operation signal OS are operated by the AND logic operation, the AND operation signal AS being generated is only 20 KHz. In other words, for example, the modulation signal ms fed to the AND operator has only 1 pulse out of 10 pulses to be outputted by the AND operator. Therefore, the AND operation signal AS is treated as the modulation signal ms at a frequency of 20 KHz.

The voltage regulator with pulse width modulation in dual frequencies can drive the transistor by using the modulation signal at a high frequency, such as 200 KHz, under heavy load and the modulation signal at a low frequency, such as 20 KHz, under light load. As a result, the efficiency of the power conversion can be improved and the problem of noise can be prevented.

Figure 5A:
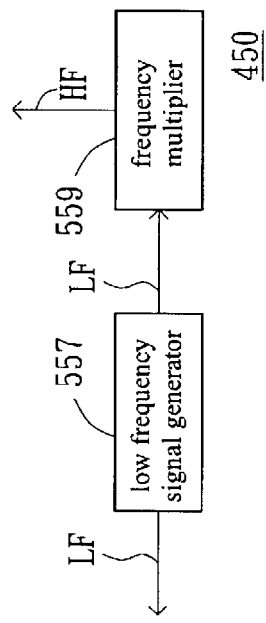
FIG. 5A illustrates an example of the dual frequency signal generator in FIG. 4.
Figure 5B:
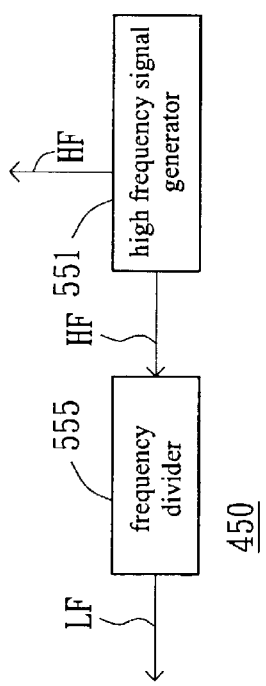
FIG. 5B illustrates another example of the dual frequency signal generator in FIG. 4.

In the practical applications, the dual frequency signal generator can be implemented with a signal generator and a frequency divider. Referring to FIG. 5A, a dual frequency signal generator 450 is illustrated in FIG. 5A in block diagram form. The dual frequency signal generator 450 includes a high frequency signal generator 551 and a frequency divider 555, wherein the high frequency signal generator 551 generates the high frequency signal HF, which is used by the modulation signal generator 120, as illustrated in FIG. 4. For example, the high frequency signal generator 551 can be an oscillator. In addition, after the high frequency signal HF is divided by the frequency divider 555, a low frequency signal LF is generated and is outputted to the OR operator. For example, if the needed high frequency signal HF is 200 KHz and the needed low frequency signal LF is 20 KHz, then a frequency divider 555 capable of providing frequency division by a factor of 10 can be taken, so as to satisfy the design requirement. Another design approach is to use a signal generator to first generate a low frequency signal, which is then multiplied up to the desired high frequency signal. FIG. 5B illustrates another dual frequency signal generator in block diagram form, including a low frequency signal generator 557 and a frequency multiplier 559. The low frequency signal generator 557 can generate the low frequency signal LF, which is used by the OR operator. In addition, after the low frequency signal LF is multiplied by the frequency multiplier 559, a high frequency signal HF is generated and is applied to the modulation signal generator 120. For example, if the needed high frequency signal HF is 200 KHz and the needed low frequency signal LF is 20 KHz, then a frequency multiplier 559 capable of providing frequency multiplication by a factor of 10 can be taken, so as to satisfy the design requirement.

Figure 6:
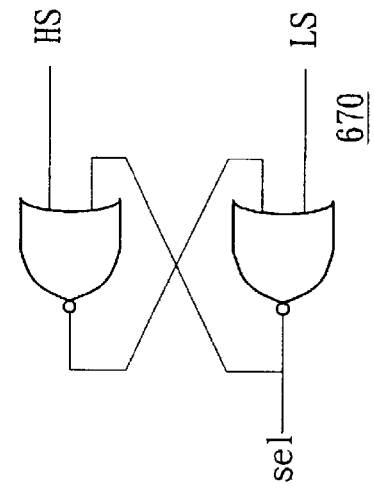
FIG. 6 illustrates a circuit of the load sensing device in FIG. 4.
Figure 7:
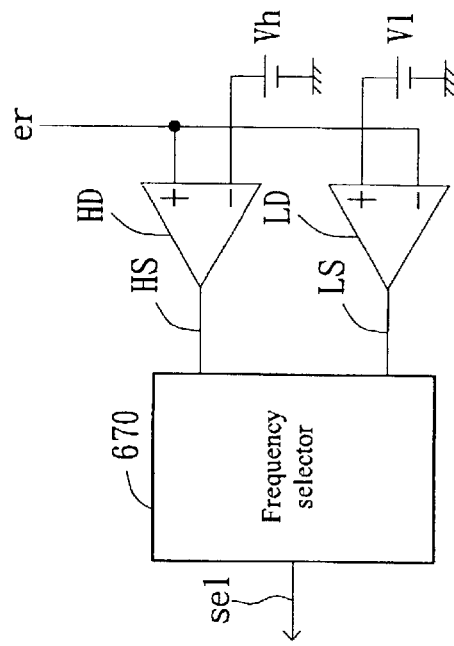
FIG. 7 illustrates a circuit of the frequency selector in FIG. 6.

In addition, the load sensing device can be implemented with a light-load sensing device, a heavy-load sensing device, and a frequency selector. FIG. 6 illustrates a circuit of the load sensing device 470. The load sensing device 470 includes a light-load sensing device LD, a heavy-load sensing device HD, and a frequency selector 670. The heavy-load sensing device HD is used for comparing the error signal er with the reference voltage Vh at heavy load. If the error signal er is greater than the reference voltage Vh at heavy load, then a heavy load signal HS is outputted to the frequency selector 670. Similarly, the light-load sensing device LD is used for comparing the error signal er with the reference voltage Vl at light load. If the error signal er is less than the reference voltage Vl at light load, then a light load signal LS is outputted to the frequency selector 670. In this manner, for example, when the frequency selector 670 receives the heavy load signal HS, the selection signal sel can be set to logic 1, and when the frequency selector 670 receives the light load signal LS, the selection signal sel can be set to logic 0. The frequency selector 670 can be implemented with a latch circuit, such as an RS latch circuit composed of NOR gate as shown in FIG. 7.

As disclosed above, a voltage regulator for pulse width modulation in dual frequencies according to the invention has the following advantages:

1. The efficiency of the power conversion under a light load condition is higher than the conventional PWM converter.
2. The issue of noise with respect to the PFM converter under light load can be effectively solved.
3. The ripple voltage being outputted is lower than that in the PFM converter.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A voltage regulator with pulse width modulation (PWM) in dual frequencies, for use in stabilizing a load voltage of a load, the voltage regulator comprising:

a switching device, for adjusting an input current to the load;

an error amplifier, coupled to the load, for outputting an error signal according to the load terminal voltage level and a reference voltage level;

a dual frequency signal generator, for outputting a high frequency signal and a low frequency signal;

a modulation signal generator, coupled to the error amplifier and the dual frequency signal generator, for outputting a modulation signal according to the error signal and the high frequency signal;

a load sensing device, coupled to the error amplifier, for determining the loading effect of the load according to the error signal, and outputting a frequency selection signal;

an OR operator, wherein the input terminals of the OR operator are respectively coupled to the dual frequency signal generator and the load sensing device, and the OR operator outputs an OR operation signal after an OR logic operation is performed on the low frequency signal and the frequency selection signal;

an AND operator, wherein the input terminals of the AND operator are respectively coupled to the modulation signal generator and the OR operator, and the AND operator outputs an AND operation signal after an AND logic operation is performed on the modulation signal and the OR operation signal; and a driving device, coupled to the AND operator and the switching device, for driving the switching device according to the AND operation signal.

2. The voltage regulator with pulse width modulation in dual frequencies as recited in claim 1, wherein the dual frequency signal generator comprises:

a high frequency signal generator, for generating the high frequency signal; and a frequency divider, coupled to the high frequency signal generator, for dividing a frequency of the high frequency signal into the low frequency signal and output the low frequency signal.

3. The voltage regulator with pulse width modulation in dual frequencies as recited in claim 2, wherein the high frequency signal generator is an oscillator.

4. The voltage regulator with pulse width modulation in dual frequencies as recited in claim 1, wherein the load sensing device comprises:

a heavy-load sensing device, coupled to the error amplifier, wherein the heavy-load sensing device outputs a heavy load signal according to the error signal and a heavy-load reference voltage;

a light-load sensing device, coupled to the error amplifier, wherein the light-load sensing device outputs a light load signal according to the error signal and a light-load reference voltage; and a frequency selector, coupled to the heavy-load sensing device and the light-load sensing device, wherein the frequency selector outputs the frequency selection signal according to the heavy load signal and the light load signal.

5. The voltage regulator with pulse width modulation in dual frequencies as recited in claim 4, wherein the heavy-load sensing device is a comparator, used for comparing the error signal with the heavy-load reference voltage and then outputting the heavy load signal.

6. The voltage regulator with pulse width modulation in dual frequencies as recited in claim 4, wherein the light-load sensing device is a comparator, for comparing the error signal with the light-load reference voltage and then outputting the light load signal.

7. The voltage regulator with pulse width modulation in dual frequencies as recited in claim 4, wherein the frequency selector is a latch circuit.

8. The voltage regulator with pulse width modulation in dual frequencies as recited in claim 7, wherein the latch circuit is an RS latch circuit.

9. The voltage regulator with pulse width modulation in dual frequencies as recited in claim 1, wherein the modulation signal generator is a comparator, and is used to compare the error signal with the high frequency signal so as to output the modulation signal.

10. The voltage regulator with pulse width modulation in dual frequencies as recited in claim 1, wherein the switching device is a bipolar junction transistor (BJT).

11. The voltage regulator with pulse width modulation in dual frequencies as recited in claim 10, wherein the bipolar junction transistor is a PNP transistor.

12. The voltage regulator with pulse width modulation in dual frequencies as recited in claim 10, wherein the bipolar junction transistor is an NPN transistor.

13. The voltage regulator with pulse width modulation in dual frequencies as recited in claim 1, wherein the high frequency signal is a signal with a sawtooth waveform.

14. The voltage regulator with pulse width modulation in dual frequencies as recited in claim 1, wherein the high frequency signal is obtained by multiplying the frequency of the low frequency signal.

15. The voltage regulator for pulse width modulation in dual frequencies as recited in claim 14, wherein the low frequency signal is a sawtooth signal.

* * * * *